June 9, 1925.  1,540,862
M. B. PUNNETT
PHOTOGRAPHIC FILM AND PROCESS OF MAKING THE SAME
Filed Jan. 12, 1923
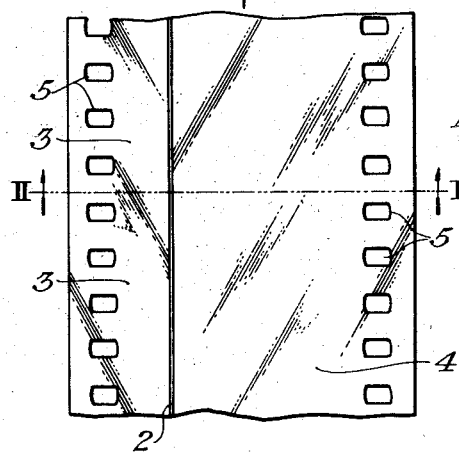
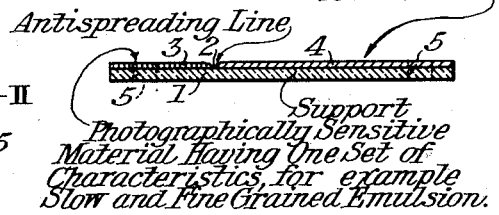
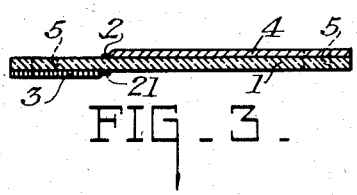
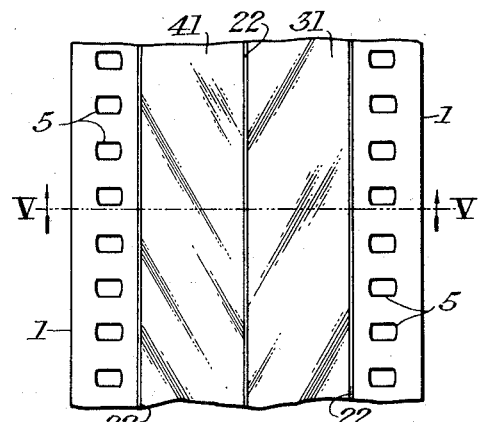
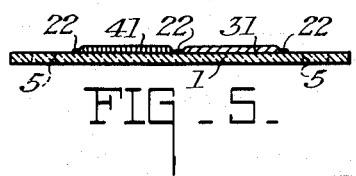
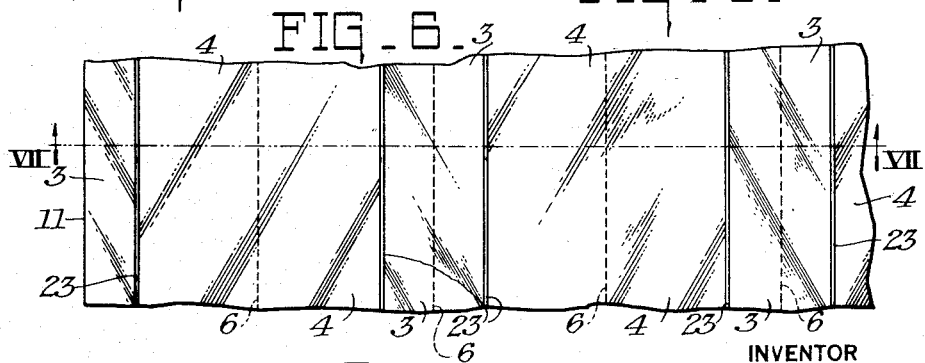
INVENTOR
Milton B. Punnett,
BY R. L. Stinchfield
ATTORNEY Patented June 9, 1925.

1,540,862

UNITED STATES PATENT OFFICE.

MILTON B. PUNNETT, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC FILM AND PROCESS OF MAKING THE SAME.

Application filed January 12, 1923. Serial No. 612,268.

*To all whom it may concern:*

Be it known that I, MILTON B. PUNNETT, a citizen of the United States of America, residing at Rochester, in the county of Monroe and State of New York, have invented certain new and useful Improvements in Photographic Films and Processes of Making the Same, of which the following is a full, clear, and exact specification.

This invention relates to photographic films having separate areas or strips of photographically sensitive materials or emulsions, some of said areas or strips having recording characteristics different from those of other areas or strips. The preferred embodiment of my invention is especially useful in connection with films for recording both picture and sound effects. My invention also relates to processes for making such films.

One object of the invention is to produce such films having light sensitive areas or strips, the edges of which are unblended and sharply defined. Another object is to produce such films in which the light sensitive areas or strips accurately follow definite lines, in order that the films may cooperate better with suitable recording instruments or systems, and without wasting any considerable part of the film surface. Another object of the invention is to provide a quick and inexpensive process for making such films. Other objects will hereinafter appear.

In the accompanying drawing:

Fig. 1. shows a fragmentary plan view upon an exaggerated scale of a film embodying the preferred form of my invention;

Fig. 2 is a diagrammatic sectional view upon an exaggerated scale taken on the line 2—2 of Fig. 1;

Fig. 3 is a similar sectional view of a modified form of my invention;

Fig. 4 is a fragmentary plan view upon an exaggerated scale of a still further illustrative form of my invention;

Fig. 5 is a sectional view on the line 5—5 of Fig. 4 showing the parts diagrammatically on an exaggerated scale;

Fig. 6 is a fragmentary plan view upon an exaggerated scale of one form of blank which may be used in my process, and Fig. 7 is a diagrammatic sectional view upon an exaggerated scale taken on the line 7—7 of Fig. 6.

It has been proposed to record sound effects by means of light on photographic films and to record pictures of the objects producing the sounds on the same film, the sound records and picture records being on adjacent areas. For example, it has been proposed to make sound records along one edge of a film strip of the motion picture type and to take motion pictures along the opposite edge. It has been found that in many of the proposed systems the photographically sensitive material on which the light effects are recorded should preferably have recording characteristics different from those of the photographic sensitive material upon which the pictures are recorded. For example, in certain cases it is desirable to have a strip of fine grained relatively slow gelatino-silver-haloid emulsion along one edge of the film and a strip of faster larger-grained emulsion along the other edge of the film, the two strips being as near together as possible without blending and the line of separation accurately following the direction of travel of the film. The preferred embodiment of my invention is concerned with such films having gelatino-silver-haloid emulsions of different speeds and resolving powers thereon and with the process of making them. I shall, therefore, describe them and a way of making them by way of illustration, but it will be understood that my invention is not limited thereto except as indicated in the appended claims.

Referring to Figs. 1 and 2, 1 indicates the support which in the preferred embodiment may be a band of cellulosic material, such as nitrocellulose or acetyl cellulose or cellulose ether. For most purposes a nitrocellulose composition is least expensive, yet satisfactory. Along this base and parallel to the edges thereof is a very thin and narrow line of wax 2. This constitutes an anti-spreading line, by which term I wish to indicate any line along which such a change has been effected that the photographically sensitive material is prevented or hindered from flowing across it. At one side of the line 2 is a strip 3 of a fine grained gelatino-silver-haloid emulsion of moderate speed. This strip ends sharply at the line 2 which accurately defines its limits. At the other side of the line 2 is a strip 4 of a faster and somewhat larger-grained gelatino-silver-haloid emulsion, such as ordinary negative film emulsion, upon which the pictures may be recorded. Strip 3 is especially useful in those types of sound recording instruments which require film of quite high resolving power, even if the speed is somewhat sacrificed. The film may be provided with the usual perforations 5, by means of which it can be moved through the recording apparatus, as will be understood by those skilled in the art.

Instead of having the strips 3 and 4 on the same side of the base 1, I may, as indicated in Fig. 3, provide an additional anti-spreading line 21 on the back of the base, preferably but not necessarily, in substantial registry with the line 2. The strip 4 is located in the same position as in Fig. 1, while the strip 3 is located on the back or reverse side of the film with its edges defined and limited by the line 21, say of wax.

Of course, the shapes of the areas and the configurations of the lines can be varied in almost any way to suit the particular problem in the solving of which the film is to be employed. In Figs. 4 and 5 I have shown a film base or support 1 coated on one face with three parallel anti-spreading lines 22, the outer ones being sufficiently separated from the edges of the film to provide uncoated areas or strips in which the perforations 5 may be made. Between the outer anti-spreading lines and the intermediate one there are located strips of slow high resolving emulsion 31 and faster picture-recording emulsion 41. Of course, the relative widths of the strips 31 and 41 can be varied to suit any special requirement.

In the making of the foregoing types of film there is difficulty in spreading lines or areas of different emulsions without the edges blending or becoming irregular in shape. These defects cause a considerable area of the film to be wasted and interfere with the use of the film economically in the recording apparatus. In the latter the different strips of emulsion should register accurately with the gates or light openings in the recording systems. This they cannot do if blending or irregularity in the edges causes one of the film strips to encroach into the space which the other strip should normally occupy.

I have overcome this difficulty by providing the above described accurately located anti-spreading lines, across which the photographically sensitive materials or emulsions do not readily spread. In other words, the freshly coated strips of emulsion spread or flow out to the lines but not beyond them. A thin and very narrow line of wax serves excellently as an anti-spreading line, although, of course, other types of such lines can be used. The repellent effect of the wax or so-called "greasy" line checks the advancing edge of the spreading emulsion if the latter is applied with ordinary care.

In order to make possible the production of film strips embodying my invention on a manufacturing scale, I prefer to provide a wide band 11 and to coat it longitudinally with a plurality of fine anti-spreading lines 23, parallel to each other and to the edges of the band. Between certain lines 23 I coat the fine-grained high-resolving-power emulsion 3, and in the remaining spaces I coat the strips 4 of the relatively faster emulsion. These strips preferably alternate. The interior strips are of double the width of the strip in the finished film. The coated blank, thus prepared, is then severed along the double width strips, for example along the dotted lines 6 in Fig. 6, thus producing films of the type shown in Fig. 1. The perforations 5 are, of course, provided in the usual way if desired.

For the anti-spreading lines I may use any suitable emulsion-repellent material, such as paraffin wax, which is brought into liquid condition by heat or, preferably, by the aid of readily volatile solvents, such as the lower paraffin hydrocarbons, like benzine. Since apparatus for applying lines of wax to film and apparatus for coating strips of emulsion on films are found in the prior art, a description of them is deemed unnecessary.

Having thus described my invention, what I claim as new and desire to secure by Letters Patent is:

1. A photographic film comprising a support having thereon separate areas of photographically sensitive materials of different recording characteristics the edges of which are defined by anti-spreading lines.

2. A photographic film comprising a support having thereon separate non-overlapping areas of photographically sensitive materials of different speeds and resolving powers, the edges of said areas being unblended and sharply defined.

3. A photographic film comprising a support having thereon separate areas of photographically sensitive material, the edges thereof being defined by waxed lines.

4. A photographic film band comprising a support having thereon separate longitudinal strips of photographically sensitive materials of different recording characteristics the adjacent longitudinal edges thereof being defined by anti-spreading lines.

5. A photographic film band comprising a support having thereon separate non-overlapping longitudinal strips of potographically sensitive materials of different speeds and resolving powers, the adjacent longitudinal edges of said strips being unblended and sharply defined.

6. A photographic film band comprising a support having thereon separate longitudinal strips of photographically sensitive materials, the edges thereof being defined by waxed lines.

7. A motion picture and sound-recording film band comprising a support having thereon a longitudinal strip of a relatively fast and large grained gelatino-silver-haloid emulsion, and a longitudinal strip of a relatively slower and finer grained gelatino-silver-haloid emulsion, said strips having adjacent edges separated by a waxed line.

8. A blank in the process of making photographic film bands, comprising a support having thereon a plurality of substantially parallel anti-spreading lines and a plurality of strips of different photographically sensitive materials separated by said lines, the width of said strips being of a larger order of magnitude than the widths of said lines.

9. A blank in the process of making motion picture and sound-recording film bands, comprising a support having thereon a plurality of waxed lines, a plurality of strips of relatively fast large-grained gelatino-silver-haloid emulsion and a plurality of strips of slower finer-grained gelatino-silver-haloid emulsion, said strips and lines being substantially parallel and said lines defining the edges of said strips.

10. In the process of making photographic films the strips of forming anti-spreading lines on film support and spreading on said support separate areas of photographically sensitive material of different recording characteristics, the spreading being limited by said lines.

11. In the process of making photographic film the steps of depositing lines of wax on film support and coating separate areas of relatively fast large-grained emulsion and slower finer-grained emulsion, the spreading of edges of said areas being limited by said lines.

Signed at Rochester, New York, this 8th day of Jan., 1923.

MILTON B. PUNNETT.